E. E. LAUVE.
Apparatus for Bleaching Cane-Juice.
No. 214,571. Patented April 22, 1879.
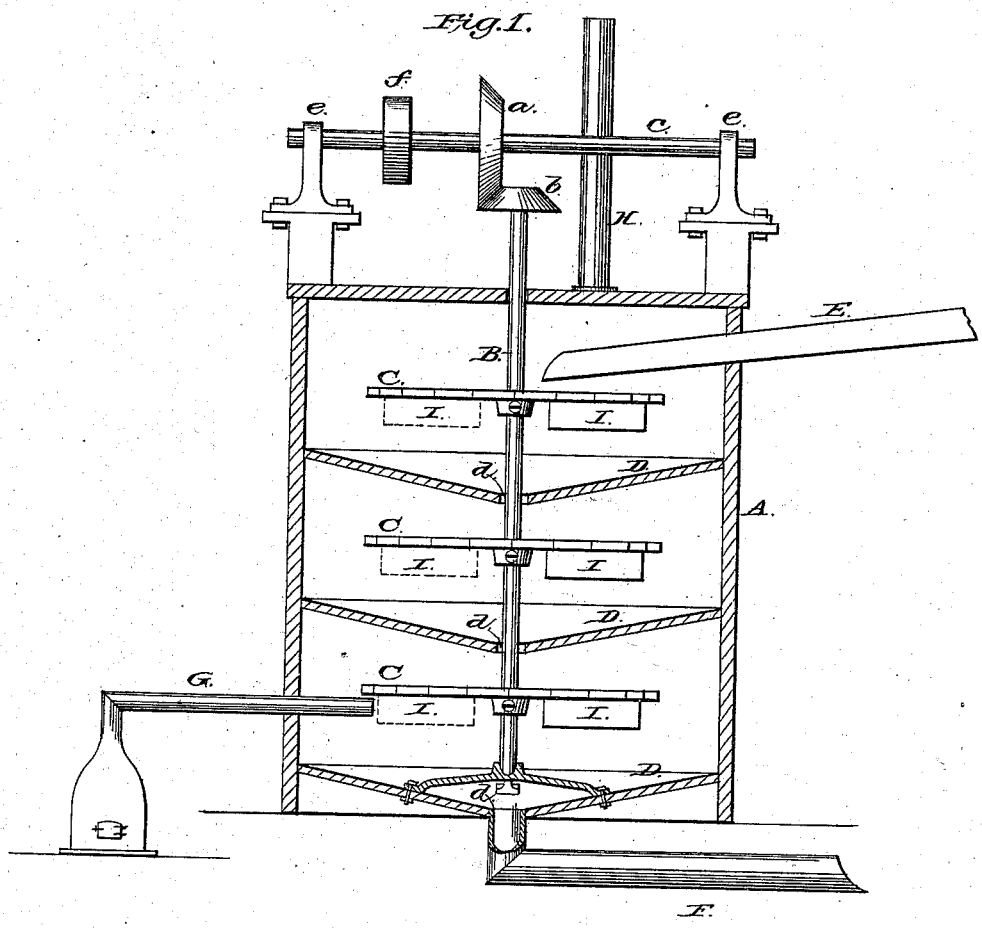
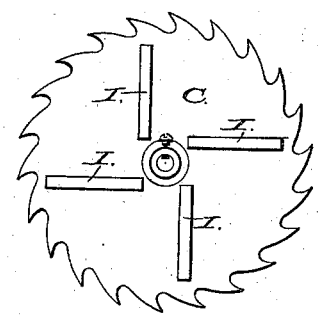
WITNESSES
INVENTOR
Emile E. Lauve
By H. Ennis,
ATTORNEY

UNITED STATES PATENT OFFICE.

EMILE E. LAUVE, OF CRANE'S FORGE, LOUISIANA.

IMPROVEMENT IN APPARATUS FOR BLEACHING CANE-JUICE.

Specification forming part of Letters Patent No. 214,571, dated April 22, 1879; application filed February 15, 1879.

*To all whom it may concern:*

Be it known that I, EMILE E. LAUVE, of Crane's Forge, in the parish of Assumption and State of Louisiana, have invented certain new and useful Improvements in Apparatus for Bleaching Cane-Juice; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to new and useful improvements in the class of apparatuses especially adapted for spraying and bleaching cane-juice; and the invention consists in the combination and arrangement of parts, all as will be hereinafter fully described, and pointed out in the claims.

In the drawings, A represents a chamber of suitable dimensions, having centrally journaled or mounted therein, in any suitable manner, a vertical shaft, B; and on this shaft, at the proper distances apart, are secured, in any desired manner, horizontal circular disks C, made of wood or other suitable material, and provided with teeth exactly like the common circular saws.

Arranged between the disks, and below the lower disk, are shelves or plates D, closing well around in said chamber A, and inclining or sloping downward toward the shaft, and provided with a central opening, $d$, by which the juice is collected and discharged successively on the disks below each plate or shelf.

The cane-juice from the mill is conducted by a spout, E, or in any other suitable manner, and delivered onto the top of the upper disk, and near the center thereof, and is scattered by the circular motion of the disk and the teeth thereon, (which thoroughly cut up or spray the juice,) and drops onto the plate or shelf, and is thence discharged onto the next disk below, and the same operation repeated until it finds its exit at the bottom of the chamber into the discharge-pipe F.

The sulphur fumes are introduced from the furnace into the chamber A by a pipe, G, under and close to the lower or bottom disk, and said fumes are drawn upward through the juice when in a fine spray by a draft produced by a chimney or flue, H, on or near the top of the chamber. A draft is also produced by small fans I on the under side of the lower disk, which, in the revolution of the disk, pass close to the pipe, conveying the sulphur fumes into said chamber. The other disks are also provided with similar fans on their under sides, to attract or draw the sulphur fumes upward through the chamber.

The shaft B is revolved by a friction-pulley, $b$, on the upper end thereof, engaging with a similar pulley, $a$, mounted on a horizontal driving-shaft, $c$, journaled in uprights $e$ on top of said chamber, the driving-shaft $c$ being provided with a band-pulley, $f$, to which motion is communicated, in the usual manner, from any suitable motor.

The disks on the shaft should make from two hundred to three hundred revolutions per minute, and the circular motion thereof, in connection with the teeth thereon, discharging or throwing it off of the disks in a fine spray, so that it is more thoroughly subjected to the sulphur fumes, which thoroughly bleaches it.

I am aware of the fact that it is not new to bleach cane-juice by means of sulphurous acid in a tank in which revolving drums reduce the liquid to a spray by centrifugal action, and also subjecting the cane-juice in a bleaching-chamber to spirally-arranged wings arranged on a revolving shaft, and alternating with shelves, and such I do not desire to claim, broadly, as my invention; but,

Having thus fully described my invention, what I claim as new, and desire to secure by Letters Patent, is—

1. In an apparatus for bleaching cane-juice, the combination, with the chamber A and shelves or plates D, having central openings, $d$, of the revolving shaft B, provided with a series of horizontal circular serrated or toothed disks, C, alternating with the shelves or plates D, substantially as and for the purpose herein shown and described.

2. In an apparatus for bleaching cane-juice, the combination, with the chamber A, having the shelves or plates D, with central openings, $d$, the inlet-flue G, and exit-flue H, of the revolving serrated or toothed disks C, provided with fans I on their under side, substantially as and for the purpose herein shown and described.

In testimony that I claim the foregoing as my own I hereunto affix my signature in presence of two witnesses.

EMILE E. LAUVE.

Witnesses:
F. S. LE BLANC,
IS. KELLER.